United States Patent [19]
Petty

[11] Patent Number: 5,862,135
[45] Date of Patent: Jan. 19, 1999

[54] SIMPLIFIED INTERFACE TO A TIME-DIVISION MULTIPLEXED COMMUNICATIONS MEDIUM

[75] Inventor: Norman W. Petty, Boulder, Colo.

[73] Assignee: Lucent Technologies Inc., Murray Hill, N.J.

[21] Appl. No.: 728,815

[22] Filed: Oct. 10, 1996

[51] Int. Cl.$^6$ ............................. H04J 3/16; H04Q 11/04
[52] U.S. Cl. .......................... 370/376; 370/378; 370/463
[58] Field of Search .................................. 370/357, 359, 370/360, 362, 363, 364, 375, 376, 377, 378, 379, 384, 422, 423, 426, 458, 462, 463

[56] References Cited

U.S. PATENT DOCUMENTS

| | | | |
|---|---|---|---|
| 4,187,399 | 2/1980 | Maxfield et al. | 370/364 |
| 4,485,468 | 11/1984 | Slana | 370/358 |
| 4,581,733 | 4/1986 | Sarson et al. | 370/426 |
| 4,656,626 | 4/1987 | Yudichak et al. | 370/374 |
| 4,791,629 | 12/1988 | Burns et al. | 370/363 |
| 5,088,089 | 2/1992 | Gingell et al. | 370/363 |
| 5,311,576 | 5/1994 | Brunson et al. | 370/362 |
| 5,323,390 | 6/1994 | Pawelski | 370/371 |
| 5,349,579 | 9/1994 | Madonna et al. | 370/385 |
| 5,410,654 | 4/1995 | Foster et al. | 395/275 |
| 5,594,727 | 1/1997 | Kolbenson et al. | 370/468 |

OTHER PUBLICATIONS

*ONYXLC—DSP56303 Revision 1.01*, Motorola Semiconductor Israel, Dec. 7, 1995, 1–3.

*Primary Examiner*—Alpus H. Hsu
*Attorney, Agent, or Firm*—David Volejnicek

[57] ABSTRACT

A processor (100, 500) that executes applications (99) which require access to time slots of a time-division multiplexed (TDM) communications medium (110) uses spare processing capacity and/or spare hardware of the processor to interface to the TDM medium and to implement a time-slot interchange (TSI) function in a simple and low-cost manner. The processor has a control store (104, 300, 504, 604) that stores a bit map of the time slots of the TDM medium. The bit map is either examined by the processor during each time slot (FIG. 2) to determine, or is used by external circuitry (301, 302) or spare internal circuitry (511) of the processor to generate interrupts (406) or DMA requests that indicate to the processor or to a host interface (510) of the processor, which time slots to access. The processor has a read buffer (105, 505) and a write buffer (106, 506) for effecting data transfers between the TDM medium and the applications. The applications have random access to the buffers, thereby effecting a time-slot-interchange function.

13 Claims, 6 Drawing Sheets

SIMPLIFIED INTERFACE TO A TIME-DIVISION MULTIPLEXED COMMUNICATIONS MEDIUM

TECHNICAL FIELD

This invention relates to time-division multiplexed communications systems, including time-slot interchange systems.

BACKGROUND OF THE INVENTION

Various modern-day telecommunications switching systems use a time-division multiplexed (TDM) communications medium as their switching fabric. An illustrative example of such systems is the Lucent Technologies Inc. Definity® private branch exchange (PBX). Port circuits that interface communications links and devices (applications) to the TDM medium normally provide access to only a relatively small number of the medium's time slots. For example, the port circuit packs of the Definity PBX provide access to any 32 time slots of the PBX's 256 time-slot TDM bus. Applications that need access to more than 32 time slots either use multiple port circuit packs or custom (and generally complex and expensive) time-slot interchange (TSI) circuits.

Applications that require access to more time slots than conventional port circuits provide, are becoming ever-more common. If such applications use multiple port circuit packs, they consume multiple circuit-pack slots on the TDM medium and thereby reduce the number of applications that the switching system can serve. If such applications use custom complex and expensive TDM interface circuits, they significantly increase the system's cost.

An ideal TDM interface would provide each application served by a port circuit pack access to all of the TDM medium's time slots that the application requires, in a simple, low-cost, manner.

SUMMARY OF THE INVENTION

This invention is directed to avoiding the disadvantages and meeting the desires of the art. Illustratively according to the invention, a processor that executes applications which require access to time slots of a TDM medium uses spare processing capacity and/or spare hardware of the processor to interface to the TDM medium and to implement a time-slot-interchange (TSI) function. The resulting interface to the TDM medium is simple and low-cost; for processors that have sufficient excess processing capacity and spare peripheral elements, the cost is effectively zero. The processor has a control store that stores a bit map of the time slots of the TDM medium. The bit map is either examined by the processor during each time slot, or preferably is used by circuitry—such as spare internal peripheral elements of the processor—to generate interrupts, to indicate to the processor which time slots to access. In the latter, interrupt-based, configuration, the processor advantageously does not waste processing on time slots which it will not be accessing. In either case, the processor advantageously has the capability of accessing any time slots of the TDM bus, as specified by the bit map. The processor has a read buffer and a write buffer for effecting data transfers between the TDM medium and the applications. The applications have random access to the buffers, thereby effecting a time-slot-interchange function.

Generally according to the invention, an interface to a TDM medium which transports data in time slots that are grouped into frames comprises a processor for executing functions (applications) that either use data from first time slots of the frames of the TDM medium or generate data for second time slots of the frames of the TDM medium. Same said processor tracks occurrence of the time slots and the frames of the TDM medium and either receives data from the first time slots of the frames of the TDM medium for use by the functions or transmits data generated by the functions in the second time slots of the frames of the TDM medium. Hence, the application-execution and interface functions are performed by the same processor, with the help of little or no additional hardware, resulting in a simple and low-cost interface.

According to one aspect of the invention, the processor includes a control store for storing a time-slot map of the frames of the TDM medium identifying either the first time slots or the second time slots, and the processor responds to each occurrence of a time slot on the TDM medium by determining from the time slot map whether the occurring time slot is a first time slot or a second time slot. This implementation advantageously requires no hardware in addition to the processor.

According to another aspect of the invention, the interface further includes a control store for storing a time slot map of the frames of the TDM medium identifying either the first time slots or the second time slots, and circuitry associated with the control store for indicating to the processor that a presently-occurring time slot is identified in the time slot map as either a first time slot or a second time slot. The processor responds to an occurrence of a time slot on the TDM medium only when the circuitry indicates that the presently-occurring time slot is identified as either a first time slot or a second time slot. Depending on whether the control store and/or associated circuitry are external or internal to the processor, this implementation may or may not require hardware in addition to the processor. However, this implementation advantageously frees the processor from performing processing for time slots that it does not access.

Preferably according to the invention, the processor includes a plurality of data storage locations (e.g., a buffer) for temporarily storing the received data or the generated data, and the processor accesses the storage locations in any order, whereby the processor effects a TSI function.

These and other advantages and features of the invention will become more apparent from the following description of an illustrative embodiment of the invention taken together with the drawing.

DETAILED DESCRIPTION

Figure 1:
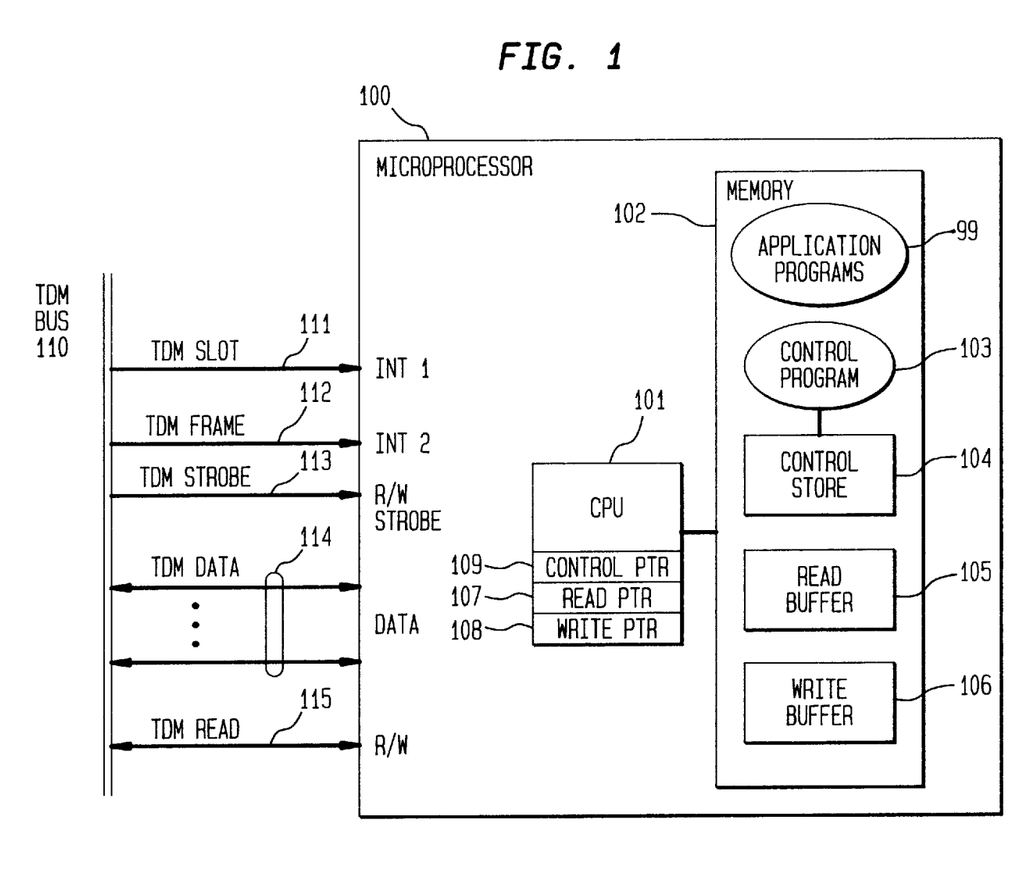
FIG. 1 is a block diagram of a first illustrative implementation of a TDM bus interface that embodies the invention.

FIG. 1 shows a first illustrative embodiment of a TDM bus interface constructed according to the principles of the invention. The TDM bus interface of FIG. 1 is implemented by a conventional microcontroller or microprocessor 100 connected to TDM bus 110. TDM bus 110 illustratively defines repeating frames each comprising 256 time slots. A TDM SLOT signal line 111 which clocks individual time slots is connected to a first interrupt input (INT 1) of microprocessor 100. A TDM FRAME signal line 112 which clocks individual frames is connected to a second interrupt input (INT 2) of microprocessor 100. (Alternatively, polled input/output (I/O) connections to microprocessor 100 may be used instead of the interrupt connections.) A TDM STROBE signal line 113 which indicates that data on TDM DATA bus 114 are stable and ready to be latched is connected to an R/W STROBE input and output of microprocessor 100. The eight leads of the byte-wide TDM DATA bus 114 are connected to the DATA inputs and outputs of microprocessor 100. And a TDM READ signal line 115, whose state indicates whether the TDM bus 110 is to be read or written, is connected to an R/W input and output of microprocessor 100.

Microprocessor 100 comprises a central processing unit (CPU) 101 and an internal memory 102, as is conventional. A block of words in memory 102 that together comprise 256 bits forms a control store 104. Control store 104 contains a bit map of the time slots of TDM bus 110, with bits set for only those time slots that microprocessor 100 will use, and bits cleared for unused time slots. A control pointer 109 defined by CPU 101 points to a present position in control store 104. A block of words in memory 102 that together comprise 256 bytes forms a read buffer 105, and another such block forms a write buffer 106. A read pointer 107 and a write pointer 108 defined by CPU 101 point to present positions in buffers 105 and 106, respectively. Memory 102 also stores a control program 103 for execution by CPU 101. As is conventional, memory 102 also stores application programs 99 for execution by CPU 101—their particulars are not relevant to the invention.

Figure 2:
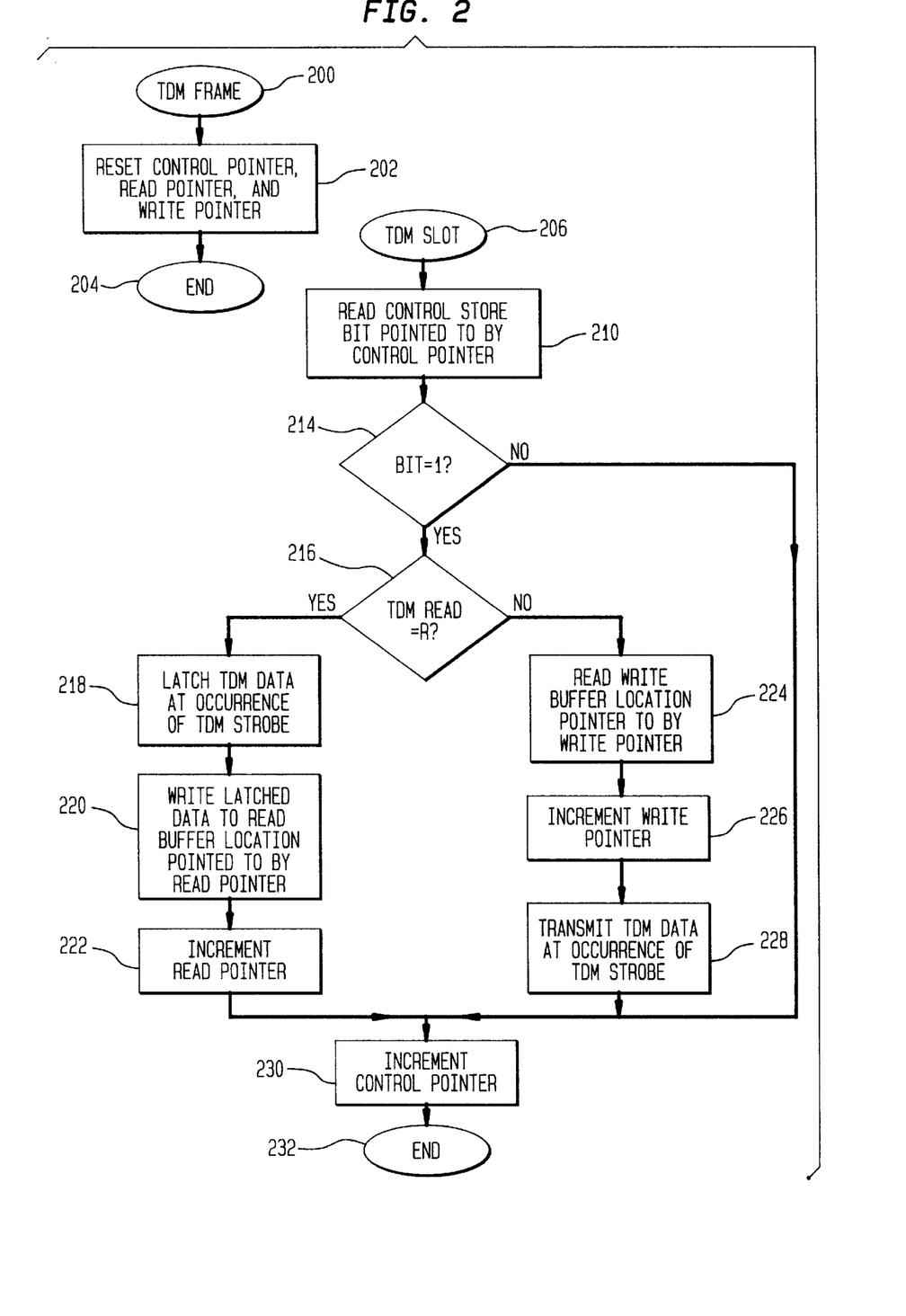
FIG. 2 is a functional flow diagram of TDM bus interface operations of the interface of FIG. 1.

The operation of control program 103 is shown in FIG. 2. Execution of control program 103 is initially invoked upon receipt of a TDM FRAME signal at the INT 2 input of microprocessor 100. Upon receipt of the TDM FRAME signal indicating the end of one frame and the beginning of a next frame, at step 200, program 103 resets pointers 107–109, at step 202. Resetting of each pointer 107–109 causes that pointer to point to the beginning—the first bit in control store 104 and the first byte in read buffer 105 and write buffer 106—of the pointer's corresponding area 104–106 of memory 102. Program 103 then ends its execution, at step 204.

Execution of program 103 is next invoked by receipt of a TDM SLOT signal at the INT 1 input of microprocessor 100, at step 206, indicating the end of one time slot and the beginning of a next time slot. In response, program 103 reads the control store 104 bit that is pointed to by control pointer 109, at step 210. Program 103 then checks the state of this bit, at step 214. If the bit is cleared, indicating that the application or applications which are served by microprocessor 100 do not use the present time slot, program 103 merely increments control pointer 109, at step 230, and ends its execution, at step 232. But if the control bit is found to be set at step 214, indicating that the applications served by microprocessor 100 do use the present time slot, program 103 checks the state of TDM READ line 115, at step 216, to determine if TDM bus 110 is to be read or written. If TDM bus 110 is to be read, program 103 causes microprocessor 100 to latch data from TDM DATA bus 114 upon occurrence of a strobe signal on TDM STROBE line 113, at step 218. Program 103 then causes microprocessor 100 to write the latched data into a location of read buffer 105 that is pointed to by read pointer 107, at step 220. Program 103 then increments read pointer 107, at step 222, and proceeds to steps 230 et seq.

If it is determined at step 216 that TDM bus 110 is to be written, program 103 causes microprocessor 100 to read a location of write buffer 106 that is pointed to by write pointer 108, at step 224. Program 103 then increments write pointer 108, at step 226, and causes microprocessor 100 to transmit the data that was read from write buffer 106 onto TDM DATA bus 114 upon occurrence of a strobe signal on TDM STROBE line 113, at step 228. Program 103 then proceeds to steps 230 et seq.

Execution of program 103 is invoked again at each occurrence of a TDM FRAME or a TDM SLOT signal, at step 200 or step 206, respectively.

Execution of other programs—e.g., application programs or input and output programs—by CPU 101 results in reading of read buffer 105 and writing of write buffer 106. Locations of buffers 105 and 106 are randomly accessible to CPU 101, whereby a time-slot interchange (TSI) function is performed by microprocessor 100.

If microprocessor 100 has sufficient spare processing capacity to execute control program 103 in addition to its other tasks (e.g., execution of application programs 99), the interface's embodiment of FIG. 1 has zero hardware cost. However, it does require microprocessor 100 to perform control-program 103 processing during each TDM time slot to determine if it is to use the present time slot. In most applications, processor 100 is likely to use only a small fraction of all of the time slots of TDM bus 110. Hence, processing required for unused time slots consumes a large fraction of the control-program 103 processing.

Figure 3:
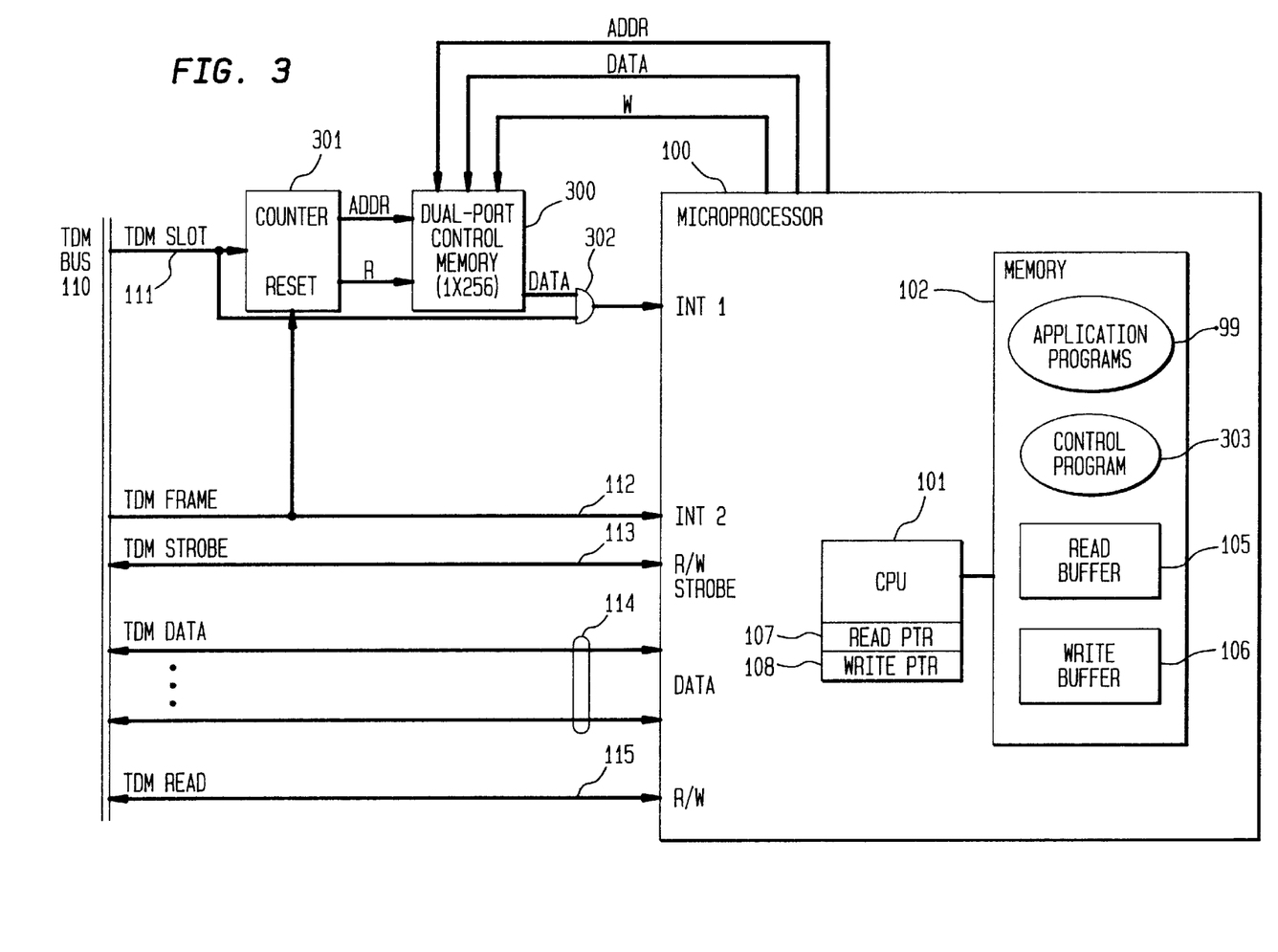
FIG. 3 is a block diagram of a second illustrative implementation of the TDM bus interface.

FIG. 3 shows a second illustrative embodiment of the TDM bus interface, which lessens the control-program-processing load on microprocessor 100 by eliminating all control-program processing for unused time slots. The interface of FIG. 3 differs from the interface of FIG. 1 in that an external control memory 300 and associated control circuitry 301–302 take the place of control store 104 and control pointer 109, and a control program 303 takes the place of control program 103.

TDM SLOT signal line 111 is connected to a data input of a counter 301. A RESET input of counter 301 is connected to TDM FRAME signal line 112. Counter 301 increments its count at each occurrence of a TDM SLOT signal, and resets its count at each occurrence of a TDM FRAME signal. The count of counter 301 is connected to an ADDRESS input of a first port of a dual-port control memory 300. A read/write input of the first port of control memory 300 is permanently set in the READ state. The contents of control memory 300 are the same as those of control store 104 of FIG. 1. Hence, control memory 300 takes the place of control store 104, while counter 301 takes the place of control pointer 109 of FIG. 1. The DATA output of the first port of control memory 300 is connected to one input of an AND gate 302, while TDM SLOT signal line 111 is connected to a second input of AND gate 302. The output of AND gate 302 is connected to the INT 1 interrupt input of microprocessor 100. Hence, microprocessor 100 receives an interrupt at the INT 1 input only when the contents of control memory 300 indicate that the present time slot indicated by the TDM SLOT signal is to be used by microprocessor 100. The address (ADDR), data (DATA), and read/write (W) inputs of the second port of control memory 300 are connected to microprocessor 100 such that microprocessor 100 is able to reprogram the contents of control memory 300.

Figure 4:
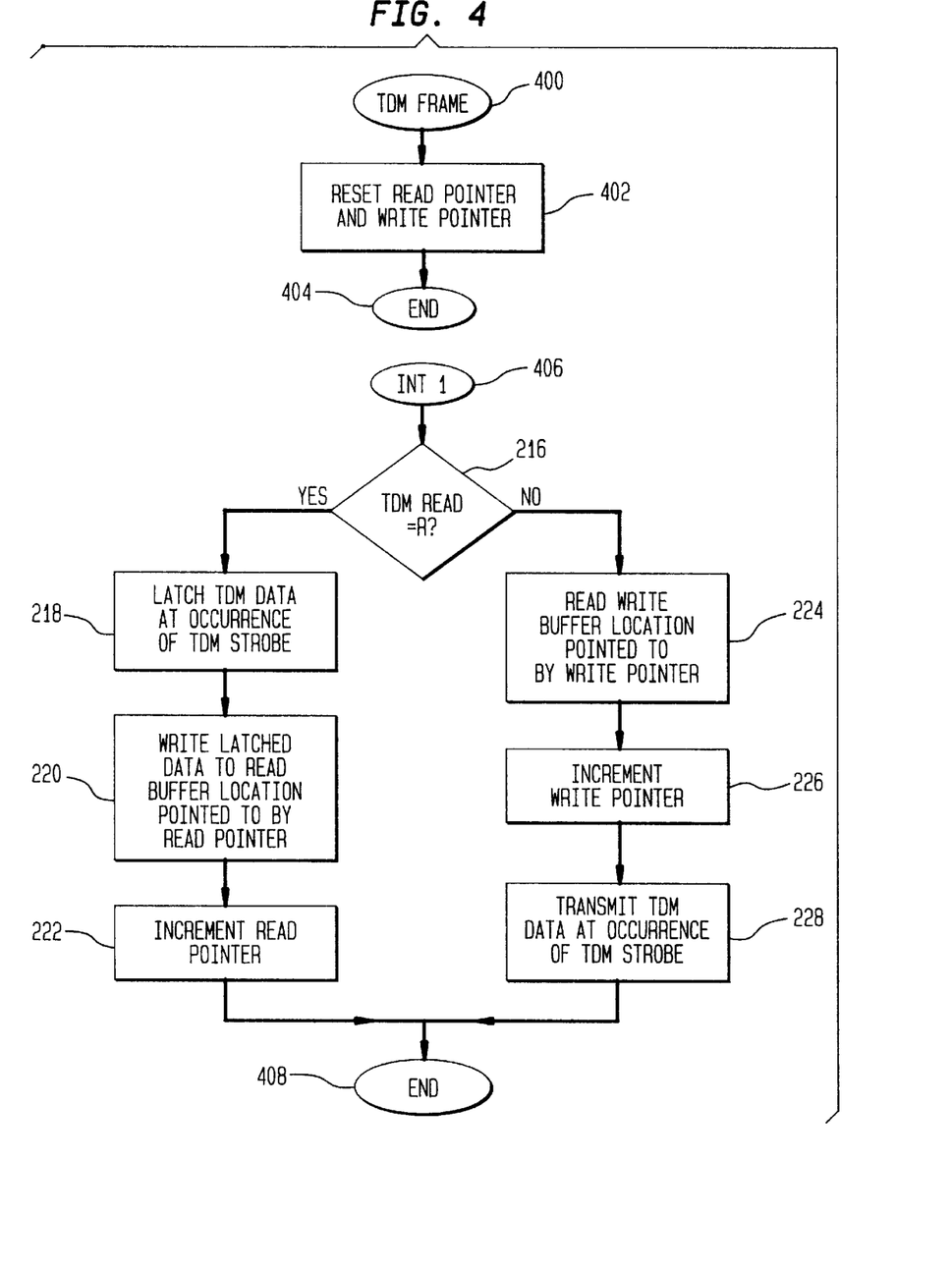
FIG. 4 is a functional flow diagram of the TDM bus interface operations of the interface of FIG. 3.

The operation of control program 303 is shown in FIG. 4. Execution of control program 303 is initially invoked upon receipt of a TDM FRAME signal at the INT 2 input of microprocessor 100, at step 400. In response, program 303 resets pointers 107 and 108, at step 402, and then ends its execution, at step 404.

Execution of program 303 is next invoked by receipt of an interrupt at the INT 1 input, at step 406. In response, control program 303 proceeds to perform the TDM bus 110 read or write operations of steps 216–228 which were described in conjunction with FIG. 2. Control program 303 then ends its execution, at step 408.

Execution of program 303 is invoked again at each occurrence of a TDM FRAME signal or receipt of an interrupt at the INT 1 input, at step 400 or step 406, respectively.

Figure 5:
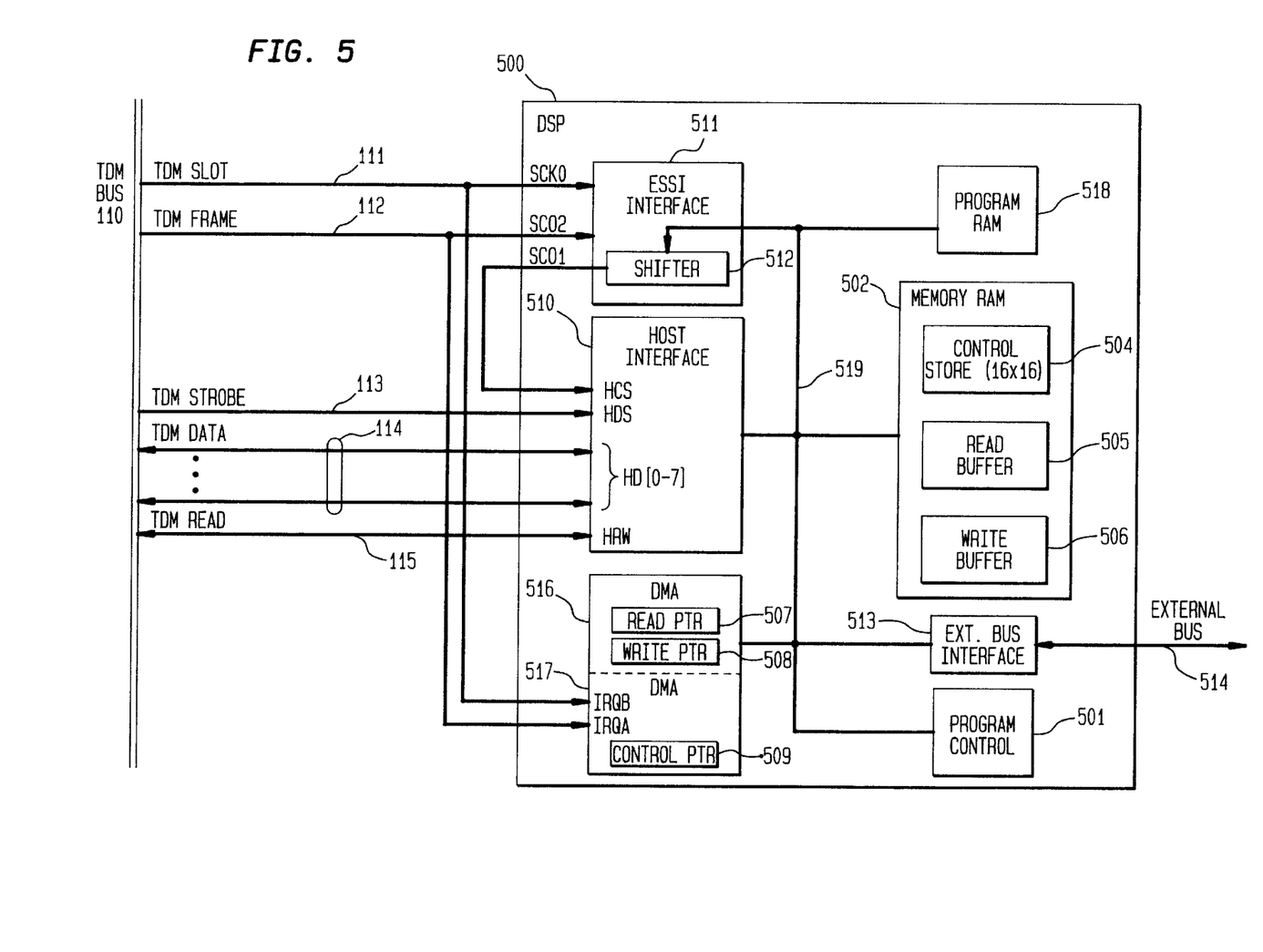
FIG. 5 is a block diagram of a third illustrative implementation of the TDM bus interface.

Port circuits of many telecommunications switching systems are equipped with digital signal processors (DSPs). FIG. 5 shows a third illustrative embodiment of the TDM bus interface which makes use of otherwise-unused components and processing capacity of a DSP 500 of a port circuit. DSP 500 is illustratively the DSP 56303 of Motorola Inc. Semiconductor Division. For simplicity and clarity of presentation, only those elements and functions of DSP 500 that are relevant to an understanding of the invention are shown in FIG. 5 and described below.

DSP 500 includes a host interface 510, a spare serial-data (ESSI) interface 511, three spare direct memory access (DMA) units including units 516 and 517 (out of a total of six that are included in the Motorola DSP 56303), a program random access memory (RAM) 518 which stores application programs 99, a memory RAM 502, a program-control section 501 (that in the Motorola DSP includes a program interrupt controller, a program decode controller, a program address generator, a data arithmetic and logic unit, a memory access controller, accumulators, and a shifter) that executes programs from program RAM 518, and an external bus interface 513 to an external bus 514. Elements 501, 502, 510, 511, 513, and 516–518 are interconnected by an internal bus 519.

TDM SLOT signal line 111 is connected to an SCK0 input of ESSI interface 511 and to an IRQB input of DMA unit 517. TDM FRAME signal line 112 is connected to an SC02 input of ESSI interface 511 and to an IRQA input of DMA unit 517. An SC01 output of ESSI interface 511 is connected to an HCS input of host interface 510. TDM STROBE signal line 113 is connected to an HDS input of host interface 510. TDM DATA bus 114 is connected to HD[0–7] inputs and outputs of host interface 510. And TDM READ signal line 115 is connected to an HRW input and output of host interface 510.

Memory RAM 502 defines a control store 504, a read buffer 505, and a write buffer 506. These data structures substantially duplicate the corresponding data structures 104–106, respectively, of FIG. 1. Control store 504 comprises 16 16-bit words which define a bit map of the time slots of TDM bus 110, with bits set for those time slots that DSP 500 will use, and bits cleared for unused time slots.

DMA unit 517 operates in conjunction with control store 504 and is configured as follows. DMA unit 517 defines a control pointer 509 to control store 504. Control pointer 509 is a substantial duplicate of control pointer 109 of FIG. 1. Upon receipt of a TDM FRAME signal at IRQA input, DMA unit 517 resets control pointer 509 to point to the beginning of control store 504, and transfers the control-store 504 word that is pointed to by control pointer 509 to ESSI interface 511. Upon receipt of every 16th TDM SLOT signal at IRQB input, DMA unit 517 increments control pointer 509 and transfers the control-store 504 word that is pointed to by control pointer 509 to ESSI interface 511.

ESSI interface 511 operates in conjunction with DMA unit 517 and is configured as follows. ESSI interface 511 comprises a 16-bit serial shifter 512. When ESSI interface 511 receives a control word from control store 504, it loads it into serial shifter 512. Then, upon each receipt of a TDM SLOT signal at its SCK0 input, serial shifter 512 shifts one bit of its contents to output SC01 of ESSI interface 511. Upon each receipt of a TDM FRAME signal at its SC02 input, ESSI interface 511 clears and resets shifter 512. (As an alternative to using spare serial data interface 511, a spare parallel data interface could be used in a similar manner.)

Host interface 510 operates in conjunction with ESSI interface 511 and is configured as follows. The one-bit series of outputs of shifter 512 is received by host interface 510 at HCS input. If the received bit is cleared, host interface 510 remains idle. If the received bit is set, host interface 510 is selected (enabled), and it checks the state of TDM READ signal line 115 at its HRW input. If line 115 indicates a read operation, upon receipt of a TDM STROBE signal at its HDS input, host interface 510 latches data from TDM DATA bus 114 at its HD[0–7] inputs. Host interface 510 then requests DMA unit 516 to transfer the latched data to read buffer 505. Conversely, if line 115 indicates a write operation, host interface 510 requests DMA unit 516 to transfer to it a word of data from write buffer 506, latches the transferred word and, upon receipt of a TDM STROBE signal, transmits the latched word onto TDM DATA bus 114.

DMA unit 516 is configured as follows. It defines a read pointer 507 to read buffer 505 and a write pointer 508 to write buffer 506. Upon receiving a read-operation request from host interface 510, DMA unit 516 retrieves the latched data from host interface 510 and stores it in the word of read buffer 505 that is pointed to by read pointer 507. DMA unit 516 then increments read pointer 507. Upon receiving a write-operation request from host interface 510, DMA unit 516 retrieves the data from the word of write buffer 506 that is pointed to by write pointer 508 and transfers this data to host interface 510. DMA unit 516 then increments write pointer 508. Upon receipt of a TDM FRAME signal at IRQA input, DMA unit 516 resets both read pointer 507 and write pointer 508 to point to the beginning of buffers 505 and 506, respectively.

Transfers between buffers 505 and 506 and external bus 514 are effected by program control 501 executing application programs 99 out of program RAM 518. Since words of buffers 505 and 506 may be accessed by program control 501 in any order, buffers 505 and 506 in conjunction with control 501 implement a time-slot interchange.

Figure 6:
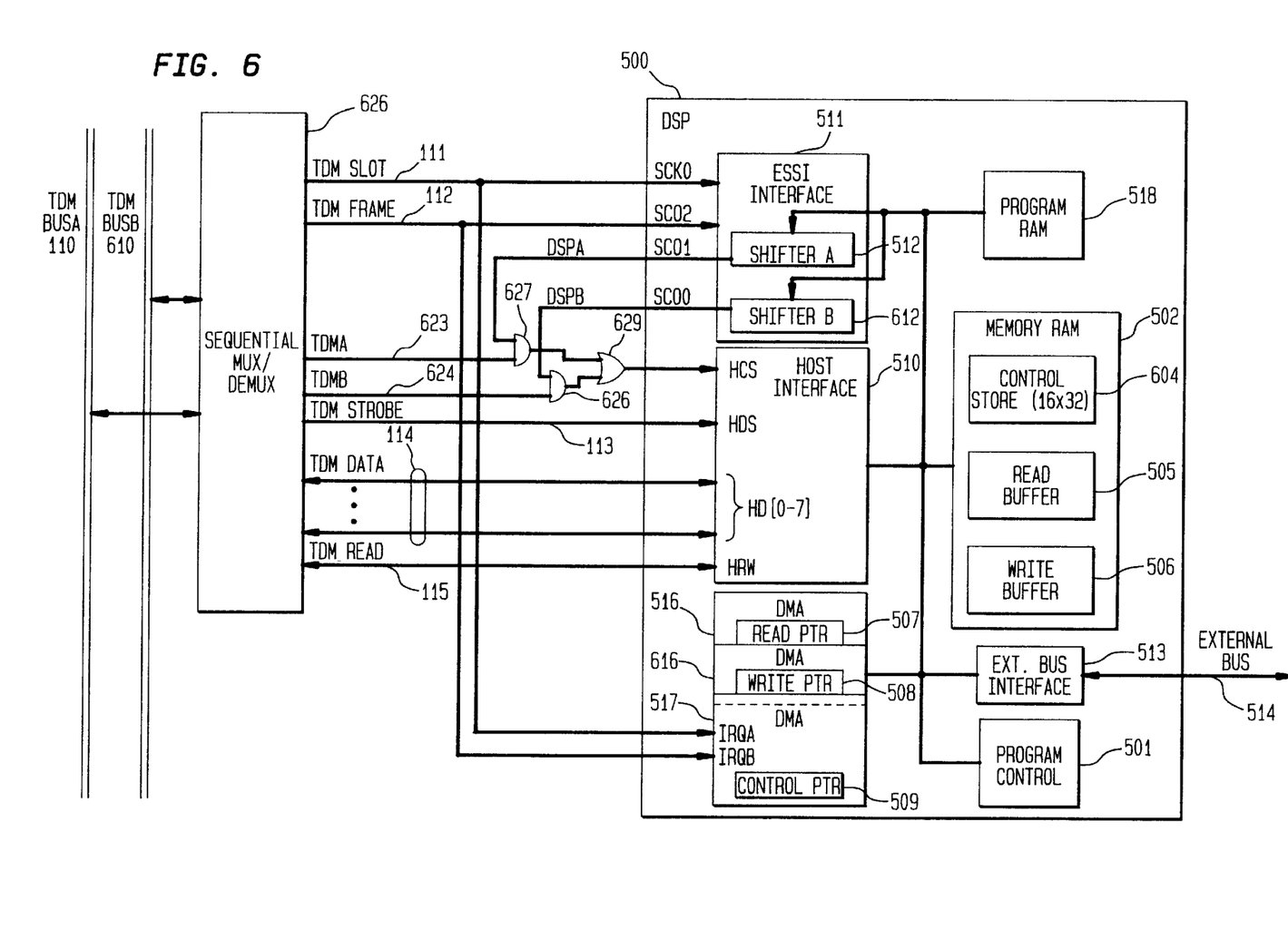
FIG. 6 is a block diagram of a fourth illustrative implementation of the TDM bus interface.

FIG. 6 shows a fourth illustrative embodiment of the TDM bus interface constructed according to the principles of the invention. The embodiment of FIG. 6 is an extension of the embodiment of FIG. 5 that enables DSP 500 to interface to two TDM buses (designated TDM A and TDM B) 110 and 610 that operate in parallel with each other and that are synchronized with each other. During any time slot, DSP 500 can access either one or both of the two TDM buses 110 and 610. DSP 500 is interfaced to TDM buses 110 and 610 through a sequential multiplexer/demultiplexer (MUX/DEMUX) 626. Such devices are known in the art. An illustrative example may be found in the patent application of N. W. Petty et al. entitled "Hybrid Time-Slot and Sub-Time-Slot Operation in a Time-Division Multiplexed System", Ser. No. 08/728,814, filed on Oct. 10, 1996, which is hereby incorporated herein by reference. In addition to the signal lines 111–115, MUX/DEMUX 626 connects to DSP 500 via TDM A signal line 623 and TDM B signal line 624, by means of which MUX/DEMUX 626 indicates to DSP 500 which one of the two TDM buses 110 and 610 is presently connected to DSP 500. In order to accommodate up to two time slot accesses per time slot interval, host interface 510 in FIG. 6 operates at double the speed of host interface 510 of FIG. 5.

In this implementation, memory RAM 502 defines a control store 604 which is twice as large as the control store 504 of FIG. 5 and which contains two time-slot bit-maps, one for each TDM bus 110 and 610. Illustratively, the two bit maps are word-interleaved with each other.

DMA unit 517 defines a control pointer 609 to control store 604. Upon receipt of a TDM FRAME signal at IRQA input, DMA unit 517 resets control pointer 609 to point to the beginning of control store 604, and transfers two control-store 604 words—illustratively the one that is pointed to by control pointer 609 and the next sequential one—to ESSI interface 511. ESSI interface 511 thus receives one control word for each one of the two TDM buses 110 and 610. Upon receipt of every 16th TDM SLOT signal at IRQ B input, DMA unit 517 increments control pointer 609 by two control-store addresses and transfers two control-store 604 words—illustratively again the one that is pointed to by control pointer 609 and the next sequential one—to ESSI interface 511.

In this implementation, ESSI interface 511 is configured to comprise two 16-bit serial shifters 512 and 612—one for each TDM bus 110 and 610, respectively. When ESSI interface 511 receives a pair of control words from control store 604, it loads each into a corresponding different one of the shifters 512 and 612. Then, upon each receipt of a TDM SLOT signal at its SCK0 input, shifters 512 and 612 each shifts one bit of its contents to outputs SC01 and SC00, respectively, of ESSI interface 511 onto DSP A and DSP B signal lines, respectively. Upon each receipt of a TDM FRAME signal at its SC02 input, ESSI interface 511 clears and resets both shifters 512 and 612.

TDM A signal line 623 from sequential MUX/DEMUX 626 and DSP A signal line from ESSI interface 511 are connected to inputs of an AND gate 627. Likewise, TDM B signal line 624 and DSP B signal line are connected to inputs of an AND gate 628. The outputs of AND gates 627 and 628 are connected to inputs of an OR gate 629. The output of OR gate 629 is connected to the HCS input of host interface 510. Thus, host interface 510 is selected (enabled) either whenever DSP 500 is connected to TDM A bus 110 and the bit map for TDM A bus 110 indicates that DSP 500 is to access the present time slot, or whenever DSP 500 is connected to TDM B bus 610 and the bit map for TDM B bus 610 indicates that DSP 500 is to access the present time slot. When host interface 510 is selected, it checks the state of TDM READ signal line 115 at its HRW input. If line 115 indicates a read operation, upon receipt of a TDM STROBE signal at its HDS input, host interface 510 latches data from TDM DATA bus 114 and requests DMA unit 516 to transfer the latched data to read buffer 505. Conversely, if line 115 indicates a write operation, host interface 510 requests a DMA unit 616 to transfer to it a word of data from write buffer 505, latches the transferred word, and upon receipt of a TDM STROBE signal transmits the latched word onto TDM DATA bus 114.

In this implementation, three spare DMA units 516, 616, and 517 (out of the six that are included in the Motorola DSP 56303) are used to support the TDM bus interface operation. They are configured as follows. DMA unit 516 defines read pointer 507 to read buffer 505. Upon receiving a read-operation request from host interface 510, DMA unit 516 retrieves the latched data from host interface 510, stores it in the word of read buffer 505 that is pointed to by read pointer 507, and then increments read pointer 507. DMA unit 616 defines write pointer 508 to write buffer 505. Upon receiving a write-operation request from host interface 510, DMA unit 616 retrieves the data word of write buffer 506 that is pointed to by write pointer 508, transfers this data to host interface 510, and then increments write pointer 508. Buffers 505 and 506 thus each serve both TDM buses 110 and 610. Upon receipt of a TDM FRAME signal at IRQA input, both DMA units 516 and 616 reset their respective pointers 507 and 508. The operation of DMA unit 517 has already been described above.

As in FIG. 5, transfers between buffers 505 and 506 and external bus 514 are effected in FIG. 5 by program control 501 executing applications programs 99 out of program RAM 518. Since words of buffers 505 and 506 may be accessed by program control 501 in any order, buffers 505 and 506 in conjunction with program control 501 implement a time-slot interchange.

Of course, various changes and modifications to the illustrative embodiment described above will be apparent to those skilled in the art. For example, a parallel data controller instead of a serial data controller may be used in the implementations of FIGS. 5 and 6. In that case, the control store requires a control word for each time slot, with at most one bit for each TDM bus being set in each word. Alternatively, to avoid the use of a control word for each time slot, the parallel data controller may be used to drive an external serial shifter. Such changes and modifications can be made without departing from the spirit and the scope of the invention and without diminishing its attendant advantages. It is therefore intended that such changes and modifications be covered by the following claims.

The invention claimed is:

1. An interface to a time-division multiplexed (TDM) communications medium which transports data in time slots that are grouped into frames, comprising:

a processor using some of its processing capacity for executing applications functions that either use data received from first time slots of the frames of the TDM medium or generate data for transmission in second time slots of the frames of the TDM medium, same said processor using its spare processing capacity for interfacing to the TDM medium by tracking occurrence of the time slots and the frames of the TDM medium and either responding to occurrence of the first time slots by reading the TDM medium to receive data from the first time slots of the frames of the TDM medium for use by the application functions or responding to occurrence of the second time slots by writing the TDM medium to transmit data generated by the application functions in the second time slots of the frames of the TDM medium; and inputs and outputs of the processor for connecting the processor to the TDM medium.

2. The interface of claim 1 wherein:

the processor includes a processing unit, a first memory portion for storing the functions that either generate or use the data, for execution by the processing unit, and a second memory portion for storing a control function for tracking the time slots and the frames and either receiving or transmitting the data, for execution by same said processing unit.

3. The interface of claim 1 wherein:

the processor includes a control store for storing a time slot map of the frames of the TDM medium identifying either the first time slots or the second time slots, and the processor responds to each occurrence of a time slot on the TDM medium by determining from the time slot map whether the occurring time slot is a first time slot or a second time slot.

4. The interface of claim 1 wherein:

the interface further includes a control store for storing a time slot map of the frames of the TDM medium identifying either the first time slots or the second time slots, and circuitry associated with the control store for indicating to the processor that a presently-occurring time slot is identified in the time slot map as either a first time slot or a second time slot, and the processor responds to an occurrence of a time slot on the TDM medium only when the circuitry indicates that the presently-occurring time slot is identified as either a first time slot or a second time slot.

5. The interface of claim 1 wherein:

the processor includes a plurality of data storage locations for temporarily storing the received data or the generated data and the processor accesses the storage locations in any order, whereby the processor effects a time-slot-interchange function.

6. The interface of claim 1 wherein:

the processor includes a read buffer or a write buffer each having a plurality of data storage locations for temporarily storing the received data or the generated data in a sequence in which the stored data either have been received from the TDM medium or are to be transmitted on the TDM medium, and the functions executing on the processor access the storage locations of the read buffer or the write buffer in any order, whereby the processor effects a time-slot-interchange function.

7. The interface of claim 1 wherein:

the processor includes
- a program memory for storing the functions that either generate or use the data, for execution by the processor;
- a control memory for storing a time slot map of the frames of the TDM medium identifying either the first time slots or the second time slots;
- a data interface cooperative with the control memory for generating a signal during occurrence of each time slot which the control memory identifies as either a first time slot or a second time slot; and
- a host interface coupled to the TDM medium responsive to each said signal by either receiving data from the TDM medium or transmitting data on the TDM medium, during the occurrence of each time slot corresponding to each said signal.

8. The interface of claim 7 wherein:

the processor further includes
- a first DMA controller for transferring sequential portions of the time slot map from the control memory to the data interface.

9. The interface of claim 8 wherein:

the processor further includes
- a read buffer memory;
- a write buffer memory;
- at least one second DMA controller for transferring data received by the host interface from the host interface to the read buffer memory and for transferring data transmitted by the host interface from the write buffer memory to the host interface.

10. The interface of claim 9 wherein:

the functions stored in the program memory and executed by the processor write data into the write buffer memory in any order and read data from the read buffer memory in any order, whereby the processor effects a time slot interchange function.

11. The interface of claim 7 wherein:

the data interface comprises
- a shifter for receiving sequential portions of the time slot map from the control memory, responsive to each occurrence of a time slot by transmitting the occurring time slot's corresponding value from the time slot map to the host interface; and
- the host interface responds only to values in the time slot map received from the shifter which identify either first time slots or second time slots, by either receiving data from the TDM medium or transmitting data on the TDM medium.

12. The interface of claim 7 wherein:

the processor further includes an interface to an external bus for transmitting or receiving data to or from the external bus, and execution by the processor of the functions in the program memory either transfers data received by the host interface to the external bus interface or transfers data from the external bus interface to the host interface for transmission on the TDM medium.

13. The interface of claim 1 further comprising:

a multiplexer/demultiplexer for connecting the interface selectively to a first TDM medium and to a second TDM medium and indicating to the interface which of the TDM media is presently connected to the interface; and wherein the processor includes
- a control memory for storing a first time slot map of the frames of the first TDM medium identifying either the first time slots or the second time slots on the first TDM medium, and for storing a second time slot map of the frames of the second TDM medium identifying either the first time slots or the second time slots on the second TDM medium,
- a first data interface cooperative with the control memory for generating a first signal during occurrence of each time slot which the first time slot map identifies as either a first time slot or a second time slot,
- a second data interface cooperative with the control memory for generating a second signal during occurrence of each time slot which the second time slot map identifies as either a first time slot or a second time slot, and
- a host interface coupled to the multiplexer/demultiplexer, responsive to each said first signal while the multiplexer/demultiplexer indicates that the first TDM medium is connected to the host interface and responsive to each said second signal while the multiplexer/demultiplexer indicates that the second TDM medium is connected to the host interface, by either receiving data from the multiplexer/demultiplexer or transmitting data to the multiplexer/demultiplexer.

* * * * *